(12) United States Patent
Ogawa (10) Patent No.: US 10,129,885 B2
(45) Date of Patent: Nov. 13, 2018

(54) WIRELESS COMMUNICATION APPARATUS AND WIRELESS COMMUNICATION METHOD

(71) Applicant: SEIKO EPSON CORPORATION, Tokyo (JP)

(72) Inventor: Yohei Ogawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/426,532

(22) Filed: Feb. 7, 2017

(65) Prior Publication Data

US 2017/0265194 A1 Sep. 14, 2017

(30) Foreign Application Priority Data

Mar. 9, 2016 (JP) ................................. 2016-045296
Dec. 26, 2016 (JP) ................................. 2016-250619

(51) Int. Cl.
| | | |
|---|---|---|
| *H04W 4/00* | (2018.01) | |
| *H04W 72/04* | (2009.01) | |
| *H04W 76/14* | (2018.01) | |
| *H04W 48/16* | (2009.01) | |
| *H04W 88/08* | (2009.01) | |
| *H04W 8/00* | (2009.01) | |
| *H04W 88/06* | (2009.01) | |

(52) U.S. Cl.
CPC ....... *H04W 72/0453* (2013.01); *H04W 48/16* (2013.01); *H04W 76/14* (2018.02); *H04W 8/005* (2013.01); *H04W 88/06* (2013.01); *H04W 88/08* (2013.01)

(58) Field of Classification Search
CPC . H04W 72/0453; H04W 76/14; H04W 48/16; H04W 88/06; H04W 8/005; H04W 88/08
See application file for complete search history.

(56) References Cited

U.S. PATENT DOCUMENTS

| | | | | |
|---|---|---|---|---|
| 9,888,432 | B2 * | 2/2018 | Jung | H04W 48/16 |
| 9,913,313 | B2 * | 3/2018 | Jung | H04L 67/104 |
| 2013/0148149 | A1 * | 6/2013 | Park | G06F 3/1296 |
| | | | | 358/1.13 |
| 2013/0260674 | A1 * | 10/2013 | Shimada | H04W 76/02 |
| | | | | 455/39 |

(Continued)

FOREIGN PATENT DOCUMENTS

| | | |
|---|---|---|
| JP | 2014-225861 A | 12/2014 |
| WO | 2014/180517 A1 | 11/2014 |

OTHER PUBLICATIONS

The Extended European Search Report for the corresponding European Patent Application No. 17159733.9 dated Nov. 7, 2017.

*Primary Examiner* — Clemence S Han (57) ABSTRACT

A wireless communication apparatus includes an indirect wireless communication unit that performs wireless communication that involves an access point; a direct wireless communication unit that performs direct wireless communication that does not involve the access point; and a control unit that controls a search for the access point that is performed sequentially on a plurality of channels, in which the control unit controls the number of channels that are used by the indirect wireless communication unit for the search for the access point, according to a communication state of the direct wireless communication.

10 Claims, 8 Drawing Sheets

(56) References Cited

U.S. PATENT DOCUMENTS

| | | | |
|---|---|---|---|
| 2014/0320908 A1 | 10/2014 | Iwauchi et al. | |
| 2014/0320909 A1* | 10/2014 | Shimazaki | H04W 8/005 |
| | | | 358/1.15 |
| 2015/0351018 A1* | 12/2015 | Kim | H04W 48/16 |
| | | | 370/338 |
| 2016/0066361 A1* | 3/2016 | Ogawa | H04W 76/025 |
| | | | 370/315 |
| 2017/0064536 A1* | 3/2017 | Katar, Sr. | H04W 8/02 |
| 2017/0064618 A1* | 3/2017 | Katar, Sr. | H04W 48/16 |
| 2017/0064619 A1* | 3/2017 | Neelisetty | H04W 16/14 |

\* cited by examiner

WIRELESS COMMUNICATION APPARATUS AND WIRELESS COMMUNICATION METHOD

BACKGROUND

1. Technical Field

The present invention relates to a wireless communication apparatus and a wireless communication method.

2. Related Art

In the related art, a device is known that is equipped with an infrastructure mode in which wireless connections are made to communication terminals with an external access point serving as a relay station, and Wi-Fi (a registered trademark) Direct mode (hereinafter referred to as a "direct wireless connection mode") in which the communication terminals perform peer-to-peer direct wireless connection without involving an access point. For example, a communication apparatus that is able to operate in the infrastructure mode and the direct wireless connection mode at the same time is disclosed in JP-A-2014-225861.

Incidentally, despite the fact that a configuration for making a connection to an external access point is employed, for example, because the external access point is outside of a range of possible communication, is powered off, and so forth, in a case where an access point is not connected to a wireless communication apparatus, the wireless communication apparatus performs a search for the access point in order to make a connection to a configuration-finished access point. When searching for the access point, a wireless LAN adapter performs dynamic scan that sequentially transmits probe requests over all channels while changing the channels one by one. At this point, if, over one channel, the wireless LAN adapter can perform communication at the same time, when the access point is searched for in a state where a connection is made to a wireless communication terminal in the direct wireless connection mode using a certain channel, because the dynamic scan uses one channel, the communication with the wireless communication terminal in the direct wireless connection mode stops. Therefore, for example, in a case where a printer as the wireless communication apparatus receives printing data from a smart device as the wireless communication terminal that is connected in the direct wireless connection mode, because the printer searches for (performs the dynamic scan on) the access point, in some cases, a delay occurs in completing communication of the printing data, or data communication is interrupted.

SUMMARY

An advantage of some aspect of the invention is that a technology which can shorten the time for which direct wireless communication that does not involve an access point is delayed due to a search for an access point.

(1) According to an aspect of the invention, there is provided a wireless communication apparatus including: an indirect wireless communication unit that performs wireless communication that involves an access point; a direct wireless communication unit that performs direct wireless communication that does not involve the access point; and a control unit that controls a search for the access point that is performed sequentially on a plurality of channels, in which the control unit controls the number of channels that are used by the indirect wireless communication unit for the search for the access point, according to a communication state of the direct wireless communication.

According to the aspect of the invention, because, without all channels being searched for the access point each time the search (the dynamic scan) is performed, the number of channels that are searched is changed according to a communication state of the direct wireless communication that does not involve the access point, the time for which the direct wireless communication that does not involve the access point is delayed due to the search can be shortened.

(2) and (3) In the wireless communication apparatus, according to the time taken to search each channel for the access point, the control unit may configure a combination of channels that are set to be search targets each time the search is performed. Furthermore, the control unit may acquire a waiting time which is the time that it takes for the direct wireless communication that does not involve the access point to be interrupted due to impossibility of communication, and, according to the waiting time, may configure the combination of channels that are set to be the search targets each time the search is performed.

In a case where connections to a plurality of access points are configured for a wireless communication apparatus, and the like, the time taken to search for the access point varies from one channel to another.

Accordingly, in searching all channels for the access point a plurality of times, according to the time taken to search each channel for the access point, inconsistency in the time taken each time the search is performed may be reduced by configuring the combination of channels that are set to be the search targets each time the search is performed. Furthermore, the combination of channels that are set to be the search targets each time the search is performed may be configured in such a manner that the time taken each time the search is performed is shorter than the waiting time that is the time that it takes for the direct wireless communication which does not involve the access point to be interrupted due to the impossibility of communication.

(4) In the wireless communication apparatus, when a connection to the access point is configured, but the connection to the access point is not made, the control unit may search for the access point.

By employing this constituting, the search for the access point, the connection to which is not configured by a user, does not prevent the direct wireless communication that does not involve the access point.

(5) In the wireless communication apparatus, according to an amount of communication as the communication state, the control unit may change the number of channels that are set to be the search targets.

By employing this constitution, for example, if communication with each of the communication terminals is not actually performed although connections are made to a plurality of communication terminals through the direct wireless communication that does not involve the access point, the direct wireless communication that does not involve the access point is not delayed although the number of channels that are searched for the access point each time the search is performed is increased. That is, by employing this constitution, the efficiency with which the access point is searched for can be increased.

(6) In the wireless communication apparatus, according to the number of terminals as the communication state, the control unit may change the number of channels that are set to be the search targets.

By employing this constitution, because processing is unnecessary that acquires the amount of communication with each terminal, the efficiency with which the access point is searched for can be increased.

(7) In the wireless communication apparatus, the indirect wireless communication unit and the direct wireless communication may share an antenna that is used for wireless communication.

By employing this constitution, due to the search for the access point for the indirect wireless communication between the direct wireless communication and the indirect wireless communication that share the antenna, an influence can be reduced that is exerted on the data communication through the direct wireless connection.

(8) According to another aspect of the invention, there is provided a wireless communication method including changing the number of channels that are used for a search for an access point that is performed sequentially on a plurality of channels, according to a communication state of direct wireless communication that does not involve an access point.

According to the aspect of the invention, because, without all channels being searched for the access point each time the search (the dynamic scan) is performed, the number of channels that are searched is changed according to the communication state of the direct wireless communication that does not involve the access point, the time for which the direct wireless communication that does not involve the access point is delayed due to the search can be shortened.

Moreover, a function of each means that is set forth in claims is realized by a hardware resource of which a function is specified with a constitution itself, a hardware resource of which a function is specified by a program, or a combination of these. Furthermore, the function of each means is not limited to one that is realized with hardware resources that are physically independent of each other. Additionally, the invention also materializes as a wireless communication program or a recording medium on which the wireless communication program is recorded. Of course, the recording medium may be a magnetic recording medium, be a magneto-optical medium, and be a recording medium that will be developed from now on.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described below with reference to the accompanying drawings. Moreover, constituent elements that correspond to one another in figures are given the same reference numeral and repetitive descriptions thereof are omitted.

1. Constitution of a Wireless Communication System

Figure 1:
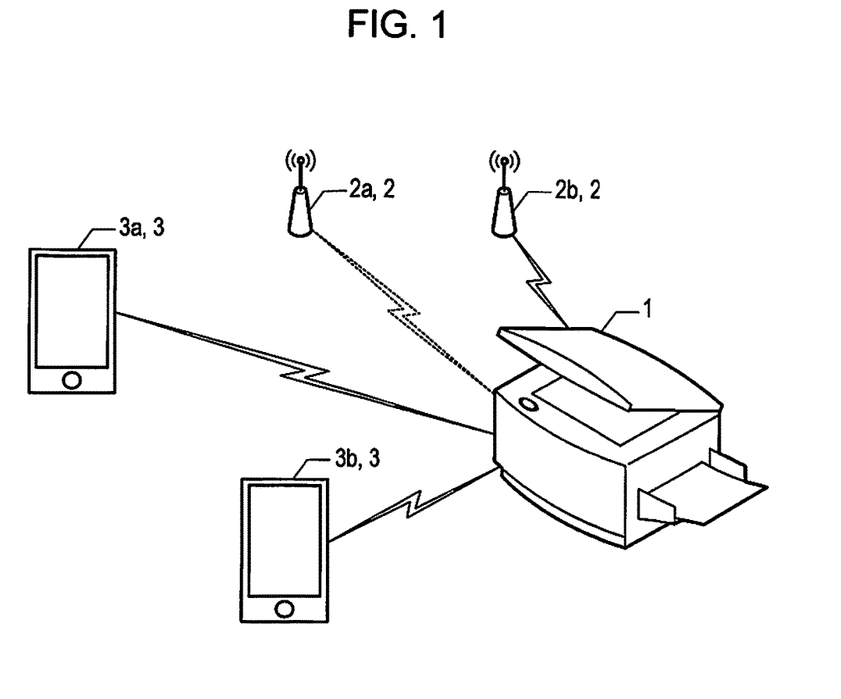
FIG. 1 is a diagram of a constitution of a wireless communication system according to the present embodiment.

FIG. 1 is a diagram illustrating a constitution of a wireless communication system according to the embodiment.

FIG. 1 illustrates the wireless communication system that includes a printer 1 as one embodiment of a wireless communication apparatus, an access point 2, and a smartphone 3 as one embodiment of a wireless communication terminal. The access point 2 is a relay station that connects external apparatuses to each other with a wireless LAN protocol (IEEE 802.11). In the embodiment, as an example, the wireless communication system in which connections to an access point 2a and an access point 2b are configured for the printer 1, and in which it is possible that the printer 1, a smartphone 3a, and the smartphone 3b are connected to one another without involving the access point 2 is described. However, the number of access points 2 that are connected to the printer 1 and the number of communication terminals that are connected to the printer 1 without involving the access point 2 are provided, as only examples, for specific description, and the number of each may be 1 or be three or more.

Figure 2:
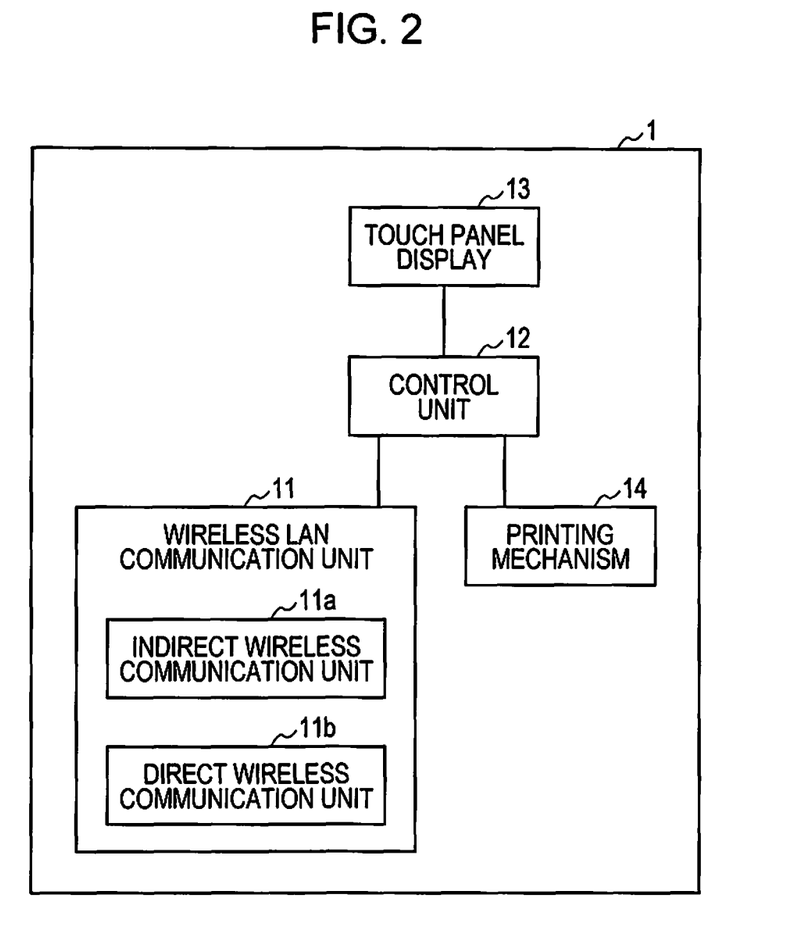
FIG. 2 is a block diagram illustrating a wireless communication apparatus according to the embodiment.

FIG. 2 is a block diagram illustrating the wireless communication apparatus according to the embodiment.

As illustrated in FIG. 2, the printer 1, as the wireless communication apparatus, includes a touch panel display 13, a control unit 12 that is constituted with a computer, a wireless LAN communication unit 11 for communicating with an external apparatus using the wireless LAN protocol, and a printing mechanism 14 that performs printing on a printing medium. The control unit 12 sequentially controls search of a plurality of channels for the access point 2. According to a combination state of direct wireless communication, the control unit 12 changes a channel that the indirect wireless communication unit 11a uses for the search for the access point 2. The control unit 12 includes a RAM that is a main storage device, a flash memory that is an external storage device, a processor, and an input and output mechanism. The control unit 12 reads a wireless communication program, which is stored in the flash memory, into the RAM, and executes the wireless communication program using the processor, thereby controlling the wireless LAN communication unit 11.

The wireless LAN communication unit 11 is a wireless LAN adapter equipped with only one antenna, and is controlled by the wireless communication program. The wireless LAN communication unit 11 has a function (indirect wireless communication) of making wireless connection to an external apparatus in an infrastructure mode through the access point 2, and a function (direct wireless communication) of making wireless connection to an external apparatus without involving the access point 2. That is, the wireless LAN communication unit 11 functions as the indirect wireless communication unit 11a and a direct wireless communication unit 11b. Moreover, various peer-to-peer communications, such as Wi-Fi (a registered trademark) Direct mode, autonomous Group Owner mode in compliance with Wi-Fi (a registered trademark) Direct specifications, and Bluetooth (a registered trademark), can be employed as the direct wireless communication. However, in the embodiment, it is assumed that the direct wireless communication is performed in the autonomous Group Owner mode in which the wireless LAN communication unit 11 (the direct wireless communication unit 11b) of the printer 1 functions as the access point.

The wireless LAN communication unit 11 described above performs the wireless communication using 13 channels CH1 to CH13. Furthermore, it is possible that the wireless LAN communication unit 11 makes a connection to a plurality of communication terminals at the same time. However, one antenna is used in a shared manner in the indirect wireless communication unit 11a and the direct wireless communication unit 11b, and because of this, it is one channel that can be used at the same time in the indirect wireless communication and the direct wireless communication. For this reason, when performing the direct wireless communication using a certain channel, the wireless LAN communication unit 11 is able to perform the indirect wireless communication using the same channel as used in the direct wireless communication, but cannot perform the indirect wireless communication that uses a different channel than the direct wireless communication. Accordingly, due to the search for the access point 2 for the indirect wireless communication between the direct wireless communication and the indirect wireless communication that share the antenna, an influence can be reduced that is exerted on data communication through direct wireless connection.

According to the time taken to search each channel for the access point 2, the control unit 12 may configure a combination of channels that are set to be search targets each time the search is performed. Furthermore, the control unit 12 may acquire a waiting time which is the time that it takes for the direct wireless communication that does not involve the access point 2 to be interrupted due to impossibility of communication, and, according to the waiting time, may configure the combination of channels that are set to be the search targets each time the search is performed.

In a case where connections to a plurality of access points 2 are configured for the printer 1, and the like, the time taken to search for the access point 2 varies from one channel to another. Accordingly, in searching all channels for the access point 2 a plurality of times, according to the time taken to search each channel for the access point 2, inconsistency in the time taken each time the search is performed may be reduced by configuring the combination of channels that are set to be the search targets each time the search is performed. Furthermore, the combination of channels that are set to be the search targets each time the search is performed may be configured in such a manner that the time taken each time the search is performed is shorter than the waiting time that is the time that it takes for the direct wireless communication which does not involve the access point 2 to be interrupted due to the impossibility of communication.

When the connection to the access point 2 is configured, but the connection to the access point 2 is not made, the control unit 12 may search for the access point 2. Accordingly, the search for the access point 2, the connection to which is not configured by a user, does not prevent the direct wireless communication that does not involve the access point 2.

According to an amount of communication as the communication state, the control unit 12 may change the number of channels that are set to be the search targets. Accordingly, for example, if communication with each of the communication terminals is not actually performed although connections are made to a plurality of communication terminals through the direct wireless communication that does not involve the access point 2, the direct wireless communication that does not involve the access point 2 is not delayed although the number of channels that are searched for the access point 2 each time the search is performed is increased. That is, by employing this constitution, the efficiency with which the access point 2 is searched for can be increased.

According to the number of connected terminals, as the communication state, the control unit 12 may change the number of channels that are to be the search targets. Accordingly, because processing is unnecessary that acquires the amount of communication with each terminal, the efficiency with which the access point 2 is searched for can be increased.

Figure 3:
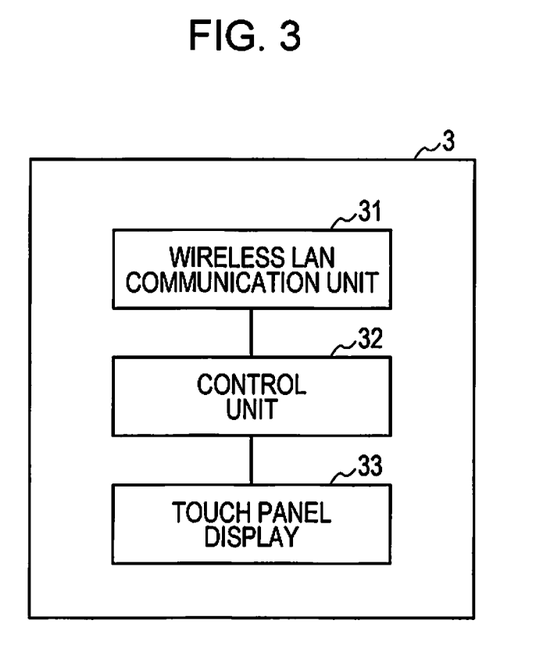
FIG. 3 is a block diagram illustrating the wireless communication terminal according to the embodiment.

FIG. 3 is a block diagram illustrating the wireless communication terminal according the embodiment.

As illustrated in FIG. 3, the wireless communication terminal, as the smartphone 3, includes a wireless LAN communication unit 31 for communicating with an external apparatus using the wireless LAN protocol, a control unit 32 that is constituted with a computer, and a touch panel display 33. The control unit 32 includes a RAM that is a main storage device, a flash memory that is an external storage device, a processor, and an input and output mechanism. The control unit 32 loads a wireless communication program, which is stored in the flash memory, into the RAM, and executes the wireless communication program using the processor, thereby controlling the wireless LAN communication unit 31. The wireless LAN communication unit 31 is controlled by the wireless communication program, and has a function of making a wireless connection to an external apparatus through the access point 2. Moreover, regardless of whether or not the wireless LAN communication unit 31 has the function of making a wireless connection to an external apparatus without involving the access point 2, in a case where the printer 1 functions as an access point, the smartphone 3 can perform the direct wireless communication with the printer 1 without involving the access point 2.

According to the embodiment, because, without all channels being searched for the access point 2 each time the search (the dynamic scan) is performed, the number of channels that are searched is changed according to the communication state of the direct wireless communication that does not involve the access point 2, the time for which the direct wireless communication that does not involve the access point 2 is delayed due to the search can be shortened.

2. Wireless Communication Method

Next, an embodiment of wireless connection processing, as a wireless communication method, which is performed by the printer 1 described above is described with reference to FIGS. 4 to 6.

Figure 4:
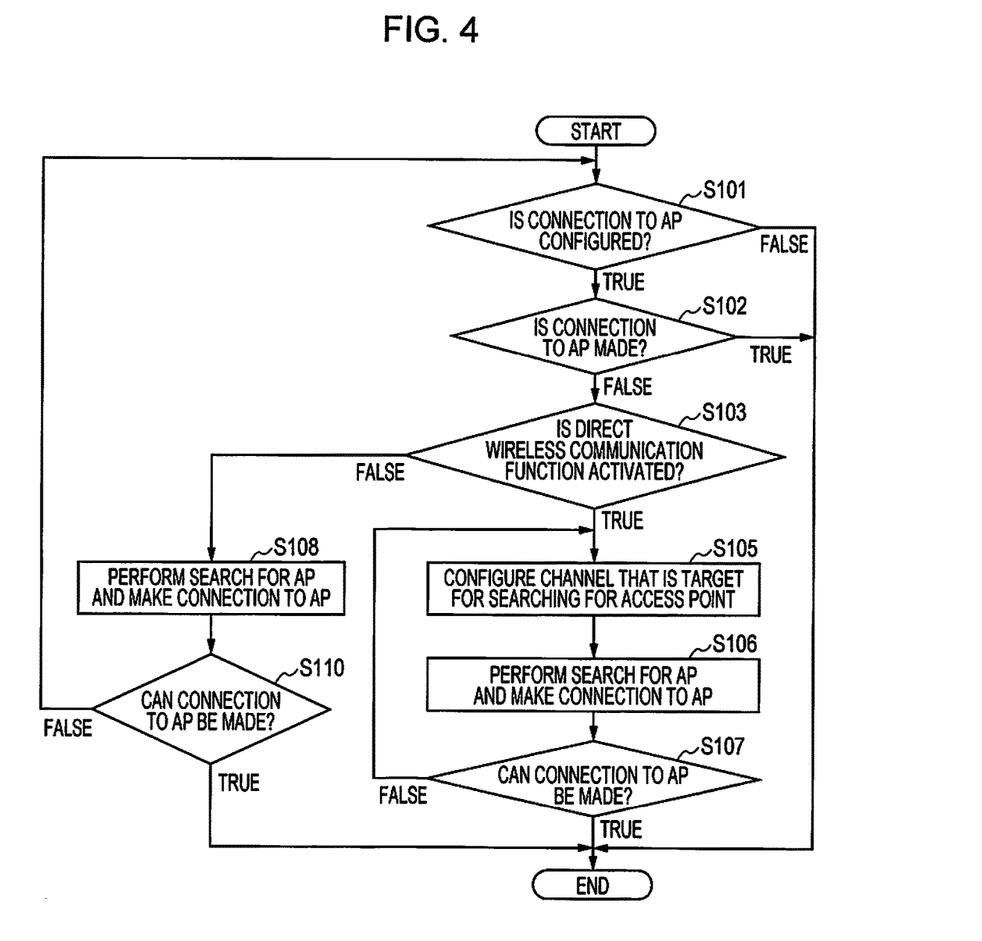
FIG. 4 is a flowchart illustrating wireless connection processing according to the embodiment.
Figure 5:
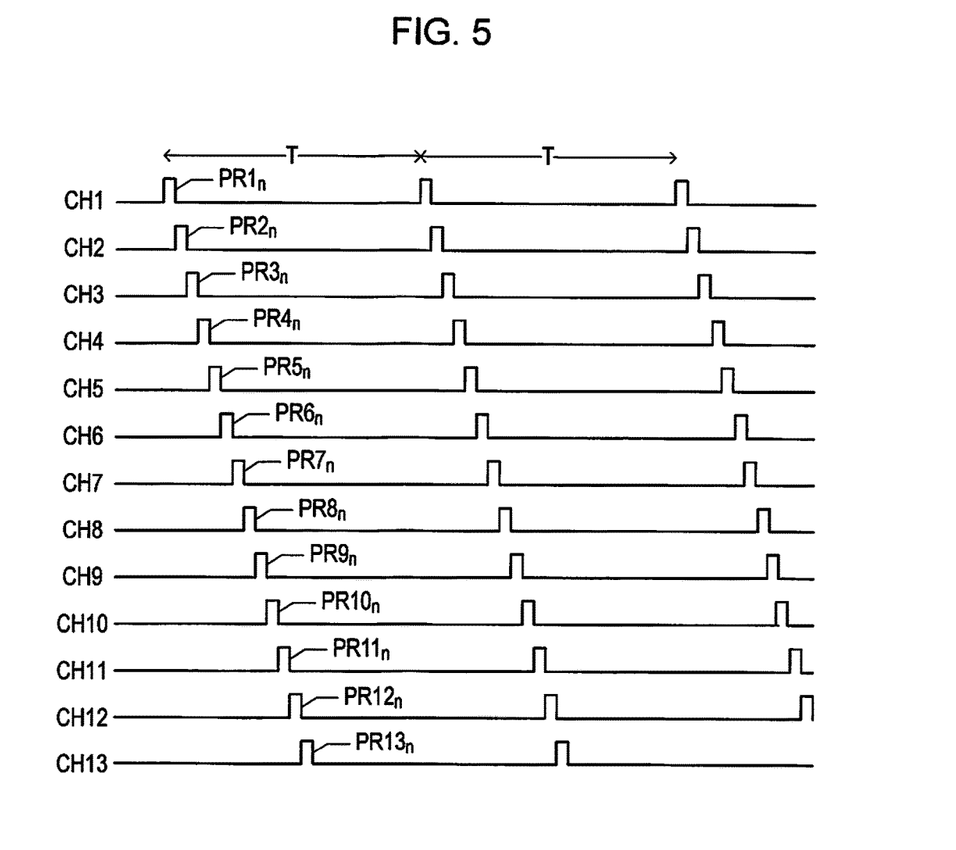
FIG. 5 is a timing chart illustrating the wireless connection processing according to the embodiment.
Figure 6:
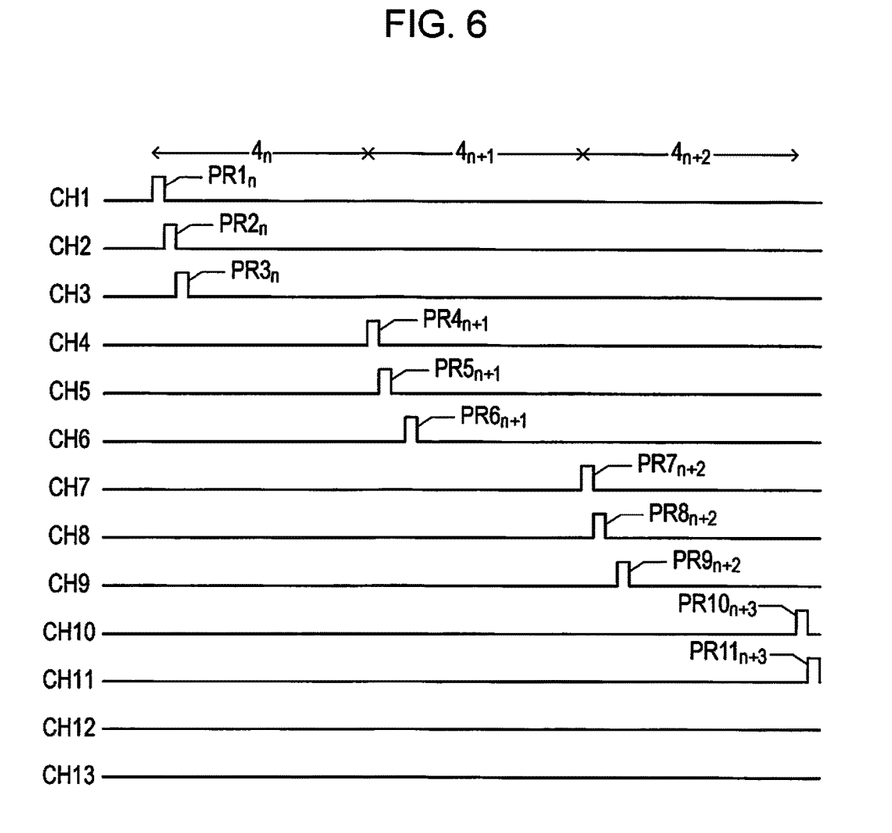
FIG. 6 is a timing chart illustrating the wireless connection processing according to the embodiment.

FIG. 4 is a flowchart illustrating wireless connection processing according to the embodiment. FIGS. 5 and 6 are timing charts illustrating wireless connection processing according to the embodiment. A sequence for wireless connection processing that is illustrated in FIG. 4 may be activated according to a user's instruction that is issued to the printer 1.

Firstly, in Step S101, the control unit 12 determines whether or not a connection to an external access point (AP) 2 is configured. If a SSID and a password are stored by the control unit 12, it is determined that connections to one or more access points 2 are configured. If not so, it is determined that the connections are not configured. In a case where the connections to one or more access points 2 are not configured (FALSE in Step S101), because there is no need to search for the access point 2, the control unit 12 ends the wireless connection processing.

In a case where the connections to one or more access points 2 are configured (TRUE in Step S101), in Step S102, the control unit 12 determines whether or not a connection is made to any one of the access points 2, the connections to which are configured. In a case where the connection is made to any one of access points 2, the connections to which are configured (TRUE in Step S102), because there is no need to search for the access point 2, the wireless connection processing is ended.

At this point, for example, although a connection to a certain access point 2 is configured for the printer 1, in a case where the access point 2 is not present within a range of reach of an electric wave from the printer 1, or in a case where the access point 2 is not powered on, a situation occurs in which the printer 1 cannot make a connection to the access point 2. In a case where the connection is not made to any one of the access points 2, the connection to which are configured (FALSE in Step S102), in Step S103, the control unit 12 determines whether or not a direct wireless communication function is activated that does not involve the access point 2. Specifically, the control unit 12 determines whether or not the printer 1 activates the function of making a connection, in a direct wireless communication mode.

In a case where the direct wireless communication function is not activated that does not involve the access point 2 (FALSE in Step S103), in Step S108, the control unit 12 repeats the search for (the dynamic scan of) the access point 2, and processing that makes a connection to the access point 2 that is found as a result of the search that uses the dynamic scan, with a fixed periodicity.

Specifically, as illustrated in FIG. 5, the control unit 12 sequentially changes the channels CH1 to CH13 one by one, and transmits probe requests PR1$_n$ to PR13$_n$ to the wireless LAN communication unit 11 one time in each of CH1 to CH13. When receiving the probe requests PR1$_n$ to PR13$_n$, the access point 2 transmits a probe response. The probe response is a packet that includes a SSID of each access point 2. When the wireless LAN communication unit 11 receives the probe response, the control unit 12 collates a SSID that is included in the probe response and a SSID that is configured for connection. In a case where the two SSIDs are consistent with each other, the control unit 12 makes a connection to the access point 2 using a password that is configured for connection. In a case where the wireless LAN communication unit 11 does not receive the probe response, and in a case where the SSID that is included in the probe response and the SSID that is configured for connection are not consistent with each other, processing for the connection to the access point 2 is not performed.

Next, in Step S110, the control unit 12 determines whether or not the connection can be made to any one of the access points 2, the connections to which are configured, through the use of the dynamic scan described above. In a case where the connection can be made to any one of the access points 2 (TRUE in Step S110), the wireless connection processing is ended. In a case where the connection cannot be made to the access point 2 (FALSE in Step S101), returning to S110 takes place after a prescribed time elapses.

On the other hand, in a case where the direct wireless communication function is activated that does not involve the access point 2 (TRUE in Step S103), in Step S105, the control unit 12 configures a channel that is a target which is searched for the access point 2 with each periodicity, and, in Step S106, performs the search of the configured search target channel for the access point 2 and makes the connection to the access point 2 sequentially with every periodicity. That is, at this point, the search for the access point 2 is performed repeatedly with a fixed periodicity, but with each periodicity, a probe request PR is transmitted to only the search target channel that is configured in Step S105, not to all channels CH1 to CH13. For example, if the search target channel is set to be configured in such a manner that the dynamic scan of all channels is ended with 4 periodicities, search targets with a 4n-th (n is an integer that is equal to or greater than 0) periodicity may be configured to be CH1 to CH3, search targets with a (4n+1)-th periodicity may be configured to be CH4 to CH6, search target with a (4n+2)-th periodicity may be configured to be CH7 to CH9, and search targets with a (4n+3)-th periodicity may be configured to be CH10 to CH13. When the search target channel with each periodicity is configured in this manner, as illustrated in FIG. 6, the probe request PR is transmitted from the wireless LAN communication unit 11.

Moreover, when it comes to the combination of channels that are the search targets with each periodicity, channels that are contiguous in this manner may be set to be the search target with the same periodicity. Non-contiguous channels may be set to be the search targets with the same periodicity in such a manner that the search targets with the 4n-th (n is an integer that is equal to or greater than 0) periodicity are configured to be CH1, CH4, CH7, and CH10, and that the search targets with the 4n+1 periodicities are configured to be CH2, CH5, CH8, and CH11. Furthermore, the search target channel may be configured in such a manner that the dynamic scan of all channels is ended within 3 periodicities, and the search target channel may be configured in such a manner that the dynamic scan of all channels ended over 5 or more periodicities.

Furthermore, the channel that is set to be the search target with each periodicity may be configured in advance before the search is repeatedly performed, and it may be selected which of CH1 to CH13 is set to be the search target with every periodicity. For example, contiguous 4 channels may be configured to be the search targets with every periodicity, in such a manner that a first periodicity is for CH1 to CH4, a second periodicity is for CH5 to CH8, a third periodicity is for CH9 to CH12, a fourth periodicity is for CH13 and CH1 to CH3, a fifth periodicity is for CH4 to CH7, and a sixth periodicity is for CH8 to CH11, and the next contiguous 4 channels may be configured to be the search target each time the periodicity changes.

When the dynamic scan is performed on the search target channel that corresponds to one periodicity, in Step S107, the control unit 12 determines to which of the access points 2, the connections to which are configured, the connection can be made. In a case where the connection can be made to any of the access points 2 (TRUE in Step S107), the wireless connection processing is ended. In a case where the connection can be made to none of the access points 2 (FALSE in Step S107), processing from Step S105 to Step S107 is repeated, and while changing the search target channel with every periodicity, with every periodicity, the search for the access point 2 is performed and the connection to the access point 2 is made.

While the performance of the dynamic scan is in progress, the direct wireless communication in the direct wireless connection mode is delayed, but the dynamic scan is performed a plurality of times on all channels, thereby shortening the time taken to perform dynamic scan one time. For this reason, according to the embodiment described above, the time for which the direct wireless communication in the direct wireless connection mode is delayed can be shortened.

3. Other Embodiments

Moreover, the technical scope of the invention is not limited to the embodiments described above, and, of course, various modifications can be made within the scope that does not depart from the gist of the invention. For example, the number of and the combination of channels that are set to be the search targets with each periodicity may be configured according to a communication state of each channel.

Figure 7:
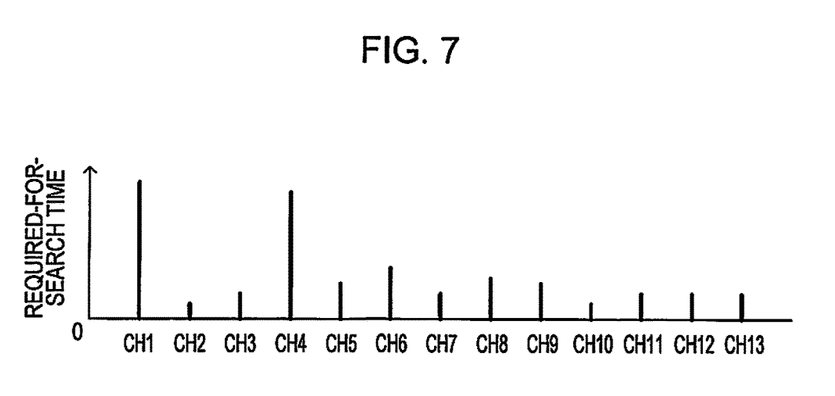
FIG. 7 is a bar graph illustrating the required-for-search time for each channel.
Figure 8:
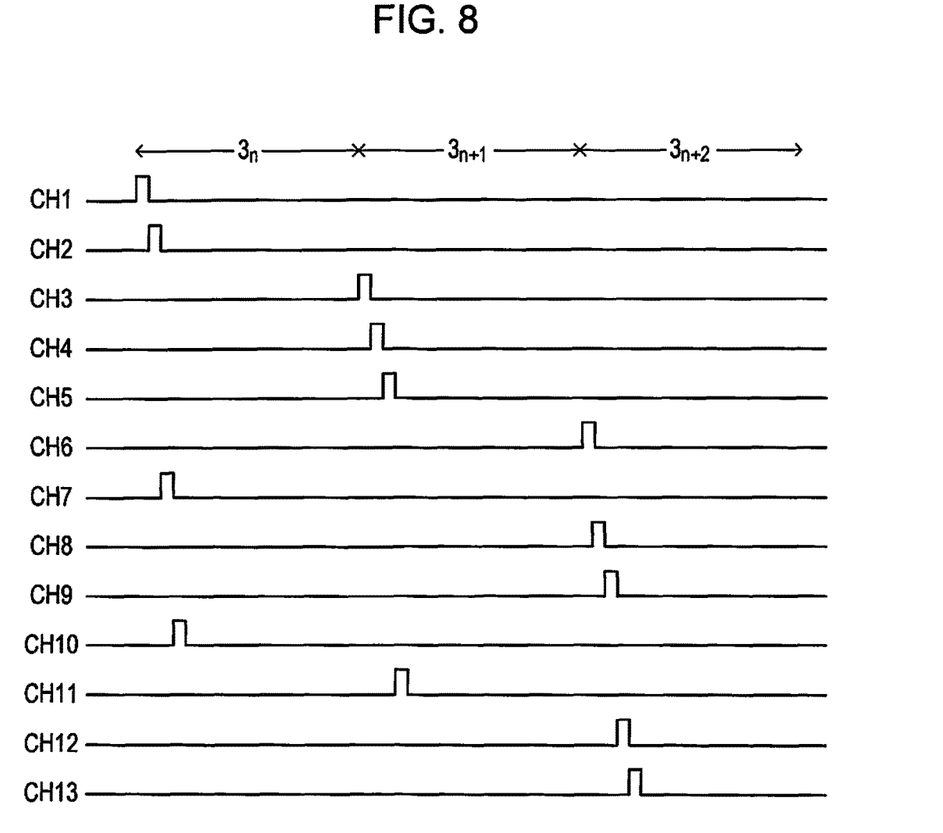
FIG. 8 is a timing chart illustrating the wireless connection processing according to the embodiment.

FIG. 7 is a bar graph illustrating the required-for-search time for each channel. FIG. 8 is a timing chart illustrating the wireless connection processing according to the embodiment.

Specifically, the time (the required-for-search time) taken to search each channel for the access point 2, and the combination of channels that are set to be the search targets is configured in such a manner that the inconsistency in the time taken for the search with each periodicity is minimized. Accordingly, the time for which the direct wireless communication which does not involve the access point 2 is interrupted due to the search for the access point 2 can be equalized. For example, in a case where the required-for-search time for each channel is measured as illustrated in FIG. 7 and combinations are made such as CH1, CH2, CH7, and CH10, CH3, CH4, CH5, and CH11, and CH6, CH8, CH9, CH12, and CH13, inconsistence in the required-for-search time for each combination is set to be minimized. In this case, if the search targets with a 3n-th periodicity are set to be CH1, CH2, CH7, and CH10, and the search targets with a (3n+1)-th periodicity are set to be CH3, CH4, CH5, and CH11, and the search targets with a (3n+2)-th periodicity are set to be CH6, CH8, CH9, CH12, and CH13, this poses no problem. Then, when the channels that are set to be the search targets with each periodicity are combined in this manner, a timing at which the probe request is transmitted from the printer 1 is as illustrated in FIG. 8.

Furthermore, as already described, while the performance of the dynamic scan with each periodicity is in progress, the direct wireless communication that does not involve the access point 2 is delayed. Then, generally, when the waiting time that is determined in advance is exceeded and thus the direct wireless communication that does not involve the access point 2 comes to an end, the connection for performing wireless communication is itself interrupted. Accordingly, the waiting time which is the time that it takes for the direct wireless communication which does not involve the access point 2 to be interrupted due to the impossibility of communication may be acquired in the printer 1, and the combination of channels that are the search targets each time the search is performed may be configured in such a manner that the required-for-search time does not exceed the waiting time each time the search is performed. As the waiting time which is the time that it takes for the direct wireless communication which does not involve the access point 2 to be interrupted due to the impossibility of communication, the shorter of the waiting time that is configured for the printer 1 which searches for the access point 2 and the waiting time that is acquired from the smartphone 3 as a result of the printer 1 searching for the access point 2 inquiring of the smartphone 3 may be configured, and the waiting time that is measured by the printer 1 that searches for the access point 2 may be acquired.

Furthermore, the amount of communication (an amount of data) in the direct wireless communication may be measured, and thus the number of channels that are set to be the search targets each time the search is performed may be changed according to the amount of communication. For example, in a case where the amount of communication in the direct wireless communication within the measurement time that is determined in advance is larger than a threshold that is determined in advance, the number of channels that are set to be the search targets with each periodicity is set to be small (for example, 2). In a case where the amount of communication is smaller than the threshold, the number of channels that are set to be the search targets are set to be large (for example, 4). Accordingly, in a case where the direct wireless communication in the direct wireless communication mode suffers from congestion, the time for which the direct wireless communication is delayed due to the dynamic scan that is performed one time can be shortened, and in a case where the direct wireless communication is idle, the time that it takes for the printer 1 to be able to be connected to the access point 2 can be shortened.

Furthermore, the number of terminals that are connected through the direct wireless communication may be acquired, and the number of channels that are set to be the search targets each time the search is performed may be changed according to the number of the connected terminals. For example, in a case where the number of the terminals that are connected through the direct wireless communication is greater than a threshold that is determined in advance, the number of channels that are set to be the search targets with each periodicity is set to be small (for example, 2). In a case where the number of the connected terminal is smaller than the threshold, the number of channels that are set to be the search targets is set to be great (for example, 4). Accordingly, in a case where the direct wireless communication in the direct wireless communication mode easily suffers from congestion, the time for which the direct wireless communication is delayed due to the dynamic scan that is performed one time can be shortened, and in a case where the direct wireless communication in the direct wireless communication mode is easily idle, the time that it takes for the printer 1 to be able to be connected to the access point 2 can be shortened.

Furthermore, in the embodiments described above, the printer is provided as an example of the wireless communication apparatus, but it goes without saying that the invention can apply to various wireless communication apparatuses, each of which includes a wireless communication unit that has a function of making a wireless connection to an external apparatus through an access point and a function of making a wireless connection to an external apparatus without involving the access point, and that realizes these two functions using one antenna.

The entire disclosure of Japanese Patent Application No. 2016-045296, filed Mar. 9, 2016 and No. 2016-250619, filed Dec. 26, 2016 is expressly incorporated by reference herein.

What is claimed is:

1. A wireless communication apparatus comprising:
a wireless communication adapter that performs indirect wireless communication that involves an access point and direct wireless communication that does not involve the access point; and
a controller that intermittently conducts a first search for the access point using a first set of selected channels and a second search for the access point using a second set of selected channels, respectively, while the direct wireless communication is being activated, the selected channels for the first search and the selected channels for the second search being differently selected from usable channels for the indirect wireless communication, wherein the controller selects the selected channels that are used for each of the first search and the second search for the access point, according to a communication state of the direct wireless communication.

2. The wireless communication apparatus according to claim 1, wherein, when a connection to the access point is configured, but the connection to the access point is not made, the controller searches for the access point.

3. The wireless communication apparatus according to claim 1, wherein the wireless communication adapter uses a shared antenna for the indirect wireless communication and the direct wireless communication.

4. The wireless communication apparatus according to claim 1, wherein the controller changes the number of the selected channels that are set to be search targets for each of the first search and the second search, according to an amount of communication.

5. The wireless communication apparatus according to claim 1, wherein the controller changes the number of selected channels that are set to be search targets for each of the first search and the second search, according to the number of terminals.

6. A wireless communication apparatus comprising:

a wireless communication adapter that performs indirect wireless communication that involves an access point and direct wireless communication that does not involve the access point; and a controller that controls a search for the access point that is performed sequentially on a plurality of channels, wherein the controller controls the number of channels that are used by the indirect wireless communication for the search for the access point, according to a communication state of the direct wireless communication, and wherein the controller configures a combination of channels that are set to search targets each time the search is performed, according to the time taken to search each channel for the access point.

7. The wireless communication apparatus according to claim 6, wherein the controller changes the number of channels that are set to be the search targets, according to an amount of communication.

8. The wireless communication apparatus according to claim 6, wherein the controller changes the number of channels that are set to be the search targets, according to the number of terminals.

9. A wireless communication apparatus comprising:

a wireless communication adapter that performs indirect wireless communication that involves an access point and direct wireless communication that does not involve the access point; and a controller that controls a search for the access point that is performed sequentially on a plurality of channels, wherein the controller controls the number of channels that are used by the indirect wireless communication for the search for the access point, according to a communication state of the direct wireless communication, and wherein the controller acquires a waiting time which is the time that it takes for the direct wireless communication that does not involve the access point to be interrupted due to impossibility of communication, and, according to the waiting time, configures a combination of channels that are set to be search targets each time the search is performed.

10. A wireless communication method comprising:

intermittently conducting a first search for an access point using a first set of selected channels and a second search for the access point using a second set of selected channels, respectively, while direct wireless communication that does not involve the access point is being activated, the selected channels for the first search and the selected channels for the second search being differently selected from usable channels for indirect wireless communication that involves the access point; and selecting the selected channels that are used for each of the first search and the second search for the access point, according to a communication state of the direct wireless communication.

* * * * *